(12) United States Patent
Simons et al.

(10) Patent No.: US 10,370,183 B2
(45) Date of Patent: Aug. 6, 2019

(54) POWDER FEEDING APPARATUS

(71) Applicant: Adamis Pharmaceuticals Corporation, San Diego, CA (US)

(72) Inventors: John K. Simons, Saint Paul, MN (US); Zhaolin Wang, Saint Paul, MN (US)

(73) Assignee: ADAMIS PHARMACEUTICALS CORPORATION, San Diego, CA (US)

(*) Notice: Subject to any disclaimer, the term of this patent is extended or adjusted under 35 U.S.C. 154(b) by 403 days.

(21) Appl. No.: 14/415,530

(22) PCT Filed: Jul. 2, 2013

(86) PCT No.: PCT/US2013/049001
§ 371 (c)(1),
(2) Date: Jan. 16, 2015

(87) PCT Pub. No.: WO2014/014650
PCT Pub. Date: Jan. 23, 2014

(65) Prior Publication Data
US 2015/0197396 A1   Jul. 16, 2015

Related U.S. Application Data

(60) Provisional application No. 61/673,460, filed on Jul. 19, 2012.

(51) Int. Cl.
*B02C 4/02* (2006.01)
*B05C 1/08* (2006.01)
(Continued)

(52) U.S. Cl.
CPC .............. *B65D 88/546* (2013.01); *B02C 4/02* (2013.01); *B05C 1/0826* (2013.01);
(Continued)

(58) Field of Classification Search
CPC ..... B05C 1/0804; B05C 1/0826; B05C 5/007; B05C 11/10–1002; B05C 11/1007;
(Continued)

(56) References Cited

U.S. PATENT DOCUMENTS 3,226,042 A * 12/1965 Adamski .................. B02C 4/02
                                                  241/159
3,908,591 A *  9/1975 Hall ......................... D06B 1/04
                                                  118/308
(Continued)

FOREIGN PATENT DOCUMENTS

EP       0069715 A1     1/1983
EP       0079478 A1     5/1983
(Continued)

OTHER PUBLICATIONS

Ganderton et al., Drug delivery to the respiratory tract. Chapter 9—The formulation and evaluation of pressurised metered-dose inhalers, pp. 87-118 (1987).

(Continued)

*Primary Examiner* — Dah-Wei D. Yuan
*Assistant Examiner* — Stephen A Kitt
(74) *Attorney, Agent, or Firm* — K&L Gates LLP; Louis C. Cullman; Hal Gibson

(57) ABSTRACT

Powder feeding apparatuses (100; 200) and methods. The powder feeding apparatus (100; 200) can include first and second cylindrical rollers (106, 107; 206, 207) adjacent to each other and spaced apart by a gap (108; 208). The first roller (106; 206) can rotate intermittently and independently of the second roller (107; 207). The second roller can rotate intermittently and independently of the first roller. Powder from a hopper (102; 202) is fed through the gap as one or both rollers rotate. The powder feeding method may include a method of feeding powder by intermittently and alternately (Continued)

advancing a first and second roller to dispense powder from the hopper.

19 Claims, 4 Drawing Sheets

(51) Int. Cl.
*B05C 11/10* (2006.01)
*B05C 19/06* (2006.01)
*B65D 88/54* (2006.01)
*B65G 65/48* (2006.01)

(52) U.S. Cl.
CPC .......... *B05C 11/1002* (2013.01); *B05C 19/06* (2013.01); *B65G 65/4881* (2013.01)

(58) Field of Classification Search
CPC ............. B05C 11/026; B05C 19/04–06; B02C 4/02–08; B02C 4/286
See application file for complete search history.

(56) References Cited

U.S. PATENT DOCUMENTS

| | | | |
|---|---|---|---|
| 3,948,264 A | 4/1976 | Wilke et al. | |
| 3,971,377 A | 7/1976 | Damani | |
| 4,048,504 A | 9/1977 | Bosshard | |
| 4,088,093 A | 5/1978 | Pan | |
| 4,139,613 A | 2/1979 | Hefele | |
| 4,147,166 A | 4/1979 | Hansen | |
| 4,153,753 A | 5/1979 | Woodman et al. | |
| 4,197,289 A | 4/1980 | Sturzenegger | |
| 4,209,553 A | 6/1980 | Greenberg | |
| 4,288,521 A | 9/1981 | Kojima et al. | |
| 4,313,972 A | 2/1982 | Goller et al. | |
| 4,470,350 A | 9/1984 | Wright | |
| 4,789,569 A | 12/1988 | Douche et al. | |
| 4,800,102 A | 1/1989 | Takada | |
| 5,088,651 A * | 2/1992 | Takahashi ................. B02C 4/02 241/101.2 |
| 5,104,230 A | 4/1992 | Douche et al. | |
| 5,118,376 A | 6/1992 | Pigneul et al. | |
| 5,192,548 A | 3/1993 | Velasquez et al. | |
| 5,408,994 A | 4/1995 | Wass et al. | |
| 5,415,717 A | 5/1995 | Perneborn | |
| 5,437,271 A | 8/1995 | Hodson et al. | |
| 5,469,843 A | 11/1995 | Hodson | |
| 5,482,032 A | 1/1996 | Smith et al. | |
| 5,503,869 A | 4/1996 | Van Oort | |
| 5,569,484 A | 10/1996 | Muller et al. | |
| 5,619,984 A | 4/1997 | Hodson | |
| 5,655,523 A | 8/1997 | Hodson | |
| 5,682,733 A | 11/1997 | Perrone | |
| 5,699,649 A | 12/1997 | Abrams et al. | |
| 5,792,513 A | 8/1998 | Koslow et al. | |
| 5,897,746 A | 4/1999 | Attenberger et al. | |
| 5,960,609 A | 10/1999 | Abrams et al. | |
| 6,037,019 A | 3/2000 | Kooyer et al. | |
| 6,102,179 A | 8/2000 | Hodson et al. | |
| 6,146,685 A | 11/2000 | Chrai et al. | |
| 6,319,541 B1 | 11/2001 | Pletcher et al. | |
| 6,440,216 B1 | 8/2002 | Aschenbeck | |
| 6,652,903 B2 | 11/2003 | Muller | |
| 7,402,734 B2 | 7/2008 | Martinell et al. | |
| 8,997,799 B2 | 4/2015 | Hodson et al. | |
| 2002/0085977 A1 | 7/2002 | Fotland et al. | |
| 2004/0094229 A1 | 5/2004 | Danby et al. | |
| 2005/0184176 A1* | 8/2005 | Kuhn ..................... A23L 27/32 241/30 |
| 2006/0024433 A1* | 2/2006 | Blessing ........... A61F 13/15658 427/180 |
| 2010/0229859 A1* | 9/2010 | Hodson ................ A61K 9/0075 128/203.15 |
| 2013/0193245 A1* | 8/2013 | Futa .................... B29B 17/0404 241/27 |
| 2015/0190593 A1 | 7/2015 | Hodson et al. | |

FOREIGN PATENT DOCUMENTS

| | | | |
|---|---|---|---|
| EP | 0166294 A2 | 1/1986 | |
| GB | 1071607 A | 6/1967 | |
| GB | 1435097 A | 5/1976 | |
| GB | 1479283 A | 7/1977 | |
| GB | 2102295 B | 5/1986 | |
| GB | 2144997 B | 5/1986 | |
| WO | 1987/005213 A1 | 9/1987 | |
| WO | 1992/019198 A1 | 11/1992 | |
| WO | 1994/012230 A1 | 6/1994 | |
| WO | 1995/021768 A1 | 8/1995 | |
| WO | 1998/031346 A1 | 7/1998 | |
| WO | 2003/077891 A1 | 9/2003 | |
| WO | 2003/088944 A1 | 10/2003 | |
| WO | 2004/017914 A2 | 3/2004 | |
| WO | 2007/112267 A2 | 10/2007 | |
| WO | 2013/006920 A1 | 1/2013 | |
| WO | WO-2013006920 A1 * | 1/2013 | ............... B30B 9/20 |
| WO | 2014/014650 A1 | 1/2014 | |

OTHER PUBLICATIONS

International Search Report and Written Opinion for International Application No. PCT/US2013/049001 filed on Jul. 2, 2013.
International Search Report and Written Opinion for International Application No. PCT/US2007/064654 filed on Mar. 22, 2007.

\* cited by examiner

POWDER FEEDING APPARATUS

CROSS REFERENCE TO RELATED APPLICATIONS

This application is a national phase application of International Application No. PCT/US2013/049001, filed Jul. 2, 2013, which claims the benefit of U.S. Provisional Patent Application No. 61/673,460, filed Jul. 19, 2012. Both of these applications are incorporated herein by reference in their entirety.

FIELD

The present disclosure relates generally to powder feeding apparatuses and methods.

BACKGROUND

Feeding particulates or powders can be more difficult than feeding liquids. This can be apparent when one desires to precisely and accurately feed a known volume or mass of material. While a number of industrial processes and devices are directed towards powder feeding, these processes and devices have several disadvantages.

BRIEF SUMMARY

Features and advantages of this disclosure will be understood upon consideration of the detailed description and claims. These and other features and advantages may be described below in connection with various embodiments of the present invention. The summary is not intended to describe all embodiments or every implementation of the present invention.

The subject matter of this disclosure, in its various combinations, either in apparatus or method form, may include the following list of embodiments:

1. A powder feeding apparatus comprising:
   a hopper having sidewalls and a bottom,
      wherein the bottom comprises first and second cylindrical rollers positioned adjacent to each other and configured so as to define a slot shaped opening between the two rollers in the hopper bottom,
   a drive system for rotating the first and second rollers, and
   a control system for controlling the drive system,
      wherein the drive system and control system are configured to intermittently rotate the first roller independently of the second roller.
2. A powder feeding apparatus according to embodiment 1, wherein the drive system and control system are configured to intermittently rotate the second roller independently of the first roller.
3. A powder feeding apparatus according to embodiment 1 or 2, wherein the drive system comprises a first motor coupled to the first roller and a second motor coupled to the second roller.
4. A powder feeding apparatus according to any one of embodiments 1 to 3, wherein the control system comprises a first controller for the first motor and a second controller for the second motor.
5. A powder feeding apparatus according to any one of embodiments 1 to 4, wherein the control system is configured to rotate the first roller while the second roller is stationary.
6. A powder feeding apparatus according to any one of embodiments 1 to 5, wherein the control system is configured to rotate the second roller while the first roller is stationary.
7. A powder feeding system comprising: a powder feeding apparatus as claimed in any one of embodiments 1 to 6; a movable web positioned beneath the slot shaped opening in the hopper bottom; and a coating roller adjacent the web and spaced apart from the position on the web beneath the slot shaped opening.
8. A powder feeding system comprising: a first powder feeding apparatus as claimed in any one of embodiments 1 to 6; a second powder feeding apparatus as claimed in any one of embodiments 1 to 6; wherein the second powder feeding apparatus is positioned so that dispensed powder from the second powder feeding apparatus is dispensed into the hopper of the first powder feeding apparatus.
9. A powder feeding method comprising:
   providing powder to a powder feeding apparatus,
      the powder feeding apparatus comprising a hopper having sidewalls and a bottom, wherein the hopper bottom comprises first and second cylindrical rollers positioned adjacent to each other and configured so as to define a slot shaped opening between the two rollers in the hopper bottom,
   and performing a plurality of powder feeding operations whereby powder is dispensed through the slot shaped opening, wherein each powder feeding operation comprises the series of steps of:
      a) rotating the first roller a fixed rotational distance,
      b) stopping the first roller,
      c) rotating the second roller a fixed rotational distance,
      d) stopping the second roller.
10. A powder feeding method according to embodiment 9, wherein each powder feeding operation further comprises the step of removing a portion of the powder adhering to the first and second rollers.
11. A powder feeding method according to embodiment 9 or 10, wherein each powder feeding operation further comprises a hold period wherein neither roller is rotating.
12. A powder feeding method comprising the steps of:
   providing powder to a powder feeding apparatus,
      the powder feeding apparatus comprising a hopper having sidewalls and a bottom, wherein the hopper bottom comprises first and second cylindrical rollers positioned adjacent to each other and configured so as to define a slot shaped opening between the two rollers in the hopper bottom,
      wherein the first roller is characterized by a first hopper facing surface that is at least partially in contact with the provided powder that has not yet passed through the slot shaped opening, and
      wherein the second roller is characterized by a second hopper facing surface that is at least partially in contact with the provided powder that has not yet passed through the slot shaped opening,
   intermittently rotating the first roller so that the first hopper facing surface moves towards the slot shaped opening, and
   rotating the second roller wherein the direction of rotation of the second roller moves the second hopper facing surface towards the slot shaped opening.
13. A powder feeding method according to embodiment 12, wherein the second roller is rotated intermittently.
14. A powder feeding method according to embodiments 12 or 13, wherein the second roller is stationary when the first roller is rotating.

15. A powder feeding method according to any one of embodiments 12 to 14, wherein the first roller is stationary when the second roller is rotating.

16. A powder feeding apparatus or a method of powder feeding according to any one of embodiments 1 to 6 or embodiments 9 to 15, and further comprising roller cleaning members adjacent the first and second rollers and positioned away from the slot shaped opening.

17. A powder feeding apparatus or a method of powder feeding according to embodiment 16, wherein the roller cleaning members are doctor blades.

18. A powder feeding apparatus or a method of powder feeding according to any one of embodiments 1 to 6 or embodiments 9 to 17, wherein the lower portion of the hopper sidewalls are sloped towards the slot shaped opening.

19. A powder feeding apparatus or a method of powder feeding according to any one of embodiments 1 to 6 or embodiments 9 to 18, wherein the slot shaped opening has a width of between about 0.3 and 5 mm.

20. A powder feeding apparatus or a method of powder feeding according to any one of embodiments 1 to 6 or embodiments 9 to 19, wherein the slot shaped opening has a length of between about 0.5 and 100 cm.

21. A powder feeding apparatus or a method of powder feeding according to any one of embodiments 1 to 6 or embodiments 9 to 20, wherein the first and second rollers have a Rockwell A hardness of greater than about 30.

22. A powder feeding apparatus or a method of powder feeding according to any one of embodiments 1 to 6 or embodiments 9 to 21, wherein the first and second rollers have a smooth outer cylindrical surface.

23. A powder feeding apparatus or a method of powder feeding according to any one of embodiments 1 to 6 or embodiments 9 to 22, wherein the outer cylindrical surface of the first and second rollers has a roughness average of less than 50 microinches (1.27 micron).

24. A powder feeding apparatus or a method of powder feeding according to any one of embodiments 1 to 6 or embodiments 9 to 23, wherein the first and second rollers comprise stainless steel.

25. A powder feeding method according to any one of embodiments 9 to 24, wherein the first and second rollers are motor-driven.

26. A powder feeding method according to any one of embodiments 9 to 25, and further comprising the step of pre-sieving the powder before providing it to the powder feeding apparatus.

27. A powder feeding method according to any one of embodiments 9 to 26, wherein the provided powder is cohesive.

28. A powder feeding method according to embodiment 27, wherein the provided cohesive powder has a repose angle greater than about 40 degrees.

29. A powder feeding method according to embodiments 27 or 28, wherein the provided cohesive powder has a Jenike flow index of less than about 4.

30. A powder feeding method according to any one of embodiments 27 to 29, wherein the provided cohesive powder has a Carr index of greater than about 20.

31. A powder feeding method according to any one of embodiments 27 to 30, wherein the provided cohesive powder has an average, primary particle size of less than about 20 microns.

32. A powder feeding method according to any one of embodiments 27 to 31, wherein the provided cohesive powder comprises a drug.

33. A powder feeding method according to any one of embodiments 27 to 32, wherein the provided cohesive powder comprises more than 2% by weight of free water.

34. A powder feeding method according to any one of embodiments 9 to 33, wherein the dispensed powder comprises fine agglomerates with an average dimension of 20 to 2000 microns.

35. A powder feeding method according to any one of embodiments 9 to 34, wherein the dispensed powder is dropped directly onto a moving web.

36. A powder feeding method according to embodiment 35, wherein the web has a microdimpled surface comprising a plurality of microdimples.

37. A powder feeding method according to embodiment 36, and further comprising the steps of filling at least a portion of the dispensed powder into the microdimples.

38. A powder feeding method according to any one of embodiments 9 to 19 or 24 to 37, wherein the first roller is characterized by a first hopper facing surface that is at least partially in contact with the provided powder that has not yet passed through the slot shaped opening and wherein the direction of rotation of the first roller moves the first hopper facing surface towards the slot shaped opening, and wherein the second roller is characterized by a second hopper facing surface that is at least partially in contact with the provided powder that has not yet passed through the slot shaped opening and wherein the direction of rotation of the second roller moves the second hopper facing surface towards the slot shaped opening.

These and other aspects of the present disclosure will become readily apparent to those of ordinary skill in the art from the following detailed description together with the drawings.

BRIEF DESCRIPTION OF THE DRAWINGS

The disclosure may be more completely understood, and those having ordinary skill in the art to which the subject invention pertains will more readily understand how to make and use the subject invention, in consideration of the following detailed description of various exemplary embodiments of the disclosure in connection with the accompanying drawings, in which.

The figures are not necessarily to scale and like numbers used in the figures can refer to like components. However, it will be understood that the use of a number to refer to a component in a given figure is not intended to limit the component in another figure labeled with the same number.

DETAILED DESCRIPTION

In the following description, reference is made to the accompanying drawings that forms a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Figure 1:
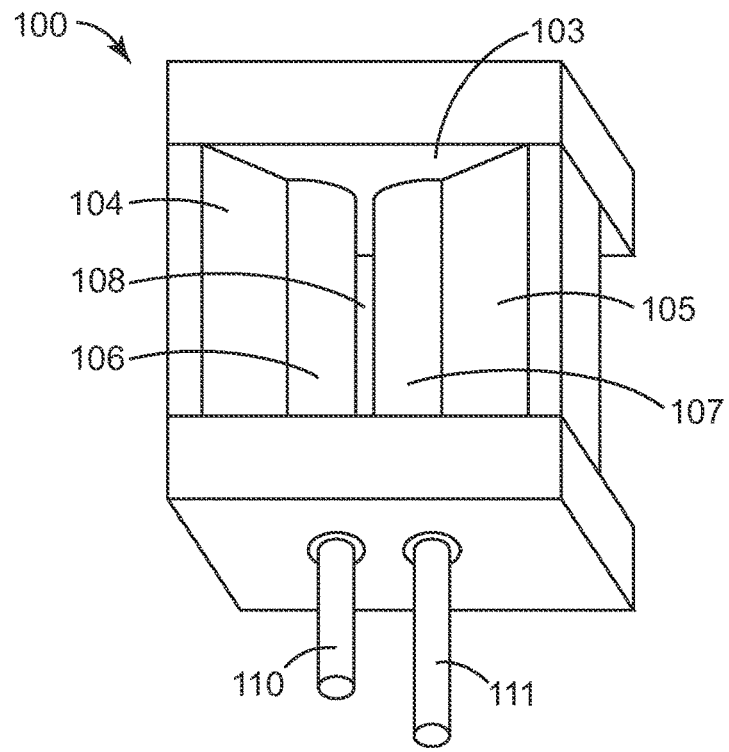
FIG. 1 is a schematic top perspective view of a powder feeding apparatus.
Figure 2:
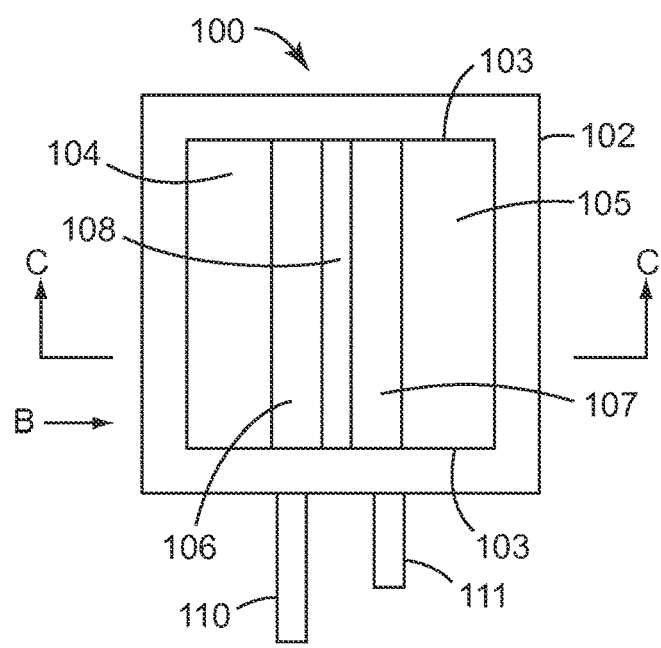
FIG. 2 is a schematic top plan view of the powder feeding apparatus of FIG. 1.
Figure 3:
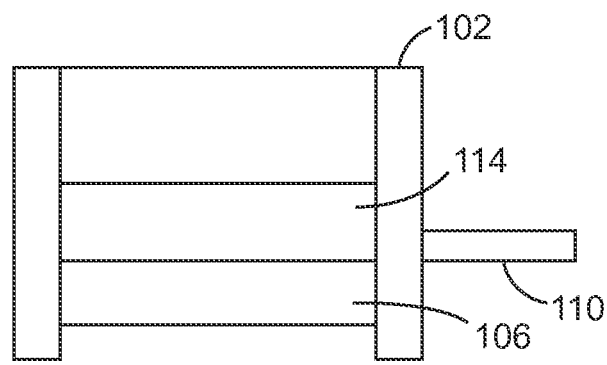
FIG. 3 is a schematic front elevational view of the powder feeding apparatus as viewed from direction B in FIG. 1.
Figure 4:
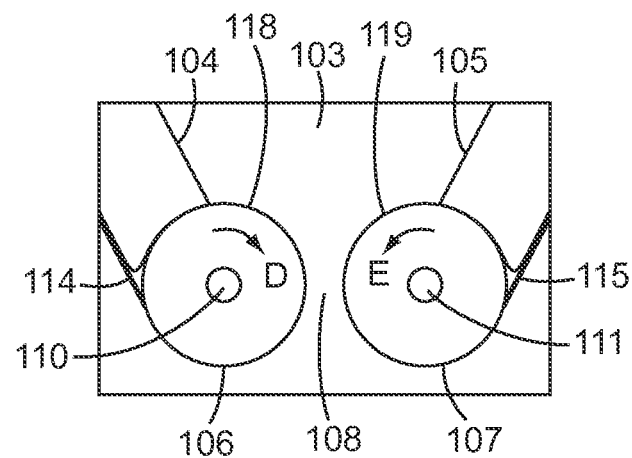
FIG. 4 is a schematic cross-sectional side view of the powder feeding apparatus as viewed along line C in FIG. 1.

One embodiment of a powder feeding apparatus 100 is shown in FIGS. 1-4. The powder feeding apparatus 100 has a hopper 102 that can be used for holding powder. A portion of the bottom of the hopper 102 can be formed by a cylindrical first roller 106 and a cylindrical second roller 107 which can be aligned parallel to each other and spaced apart so as to form a slot-shaped opening 108 in the bottom of the hopper. The first and second rollers 106, 107 can have first and second hopper facing surfaces 118, 119, respectively, that can be in at least partial contact with powder held in the hopper. The first and second rollers 106, 107 can be connected to first and second drive shafts 110, 111, respectively. The drive shafts make up part of a drive system, the remainder of which is not shown. In embodiments, the drive system comprises a first motor coupled to the first drive shaft 110 and a second motor coupled to the second drive shaft 111. The motors may be independently controlled by a control system, such that each roller may be advanced independently of the other roller. The control system can be configured such that the first roller 106 rotates in a direction so that the first hopper facing surface 118 moves towards the opening 108 and the second roller 107 rotates in a direction so that the second hopper facing surface 119 moves towards the opening 108. In other words, the first and second rollers 106, 107 turn in the directions of arrows D and E, respectively, as shown in FIG. 4. The hopper 102 has sidewalls 103 that serve to contain powder in the hopper. As shown, the hopper has sloping sidewalls 104, 105 on the sides of the hopper parallel to the axis of the roller. These sloping sidewalls 104, 105 help to guide powder to the surface of each roller and in particular may help to minimize any "dead" space in the hopper 102 where powder might tend to accumulate indefinitely without being dispensed from the hopper 102. As shown, the hopper sidewalls perpendicular to the axis of the rollers can be vertical, but in other embodiments they may also be sloped or otherwise shaped to enhance flow of powder from the upper portion of the hopper to the lower portion of the hopper. Likewise, the sloping sidewalls 104, 105 as shown can be sloped, but in other embodiments they may be vertical or otherwise shaped to enhance flow of powder from the upper portion of the hopper to the lower portion of the hopper. In some embodiments an optional vibration element (not shown) in contact with the hopper sidewalls may be included to help assist powder in flowing from the upper portion of the hopper to the lower portion of the hopper. Doctor blades 114, 115 can be positioned against the first and second rollers 106, 107, respectively, generally opposed to the area of the roller that defines the opening 108. In some instances a small amount of powder may loosely adhere to the rollers as they rotate and the doctor blades 114, 115 serve as roller cleaning members to scrape this powder off the rollers so that the surface of the roller is relatively clean as it contacts the powder in the hopper.

In embodiments, one or more parts of the powder feeding apparatus 100 may be adjustable. For example, one or both of first and second rollers 106, 107 may be movable with respect to the other so as to allow for changes in width of the opening 108. The doctor blades 114, 115 may be adjustable with respect to the first and second rollers 106, 107 so as to effectively remove loose powder from the rollers without overly restricting the rotational motion of the rollers. In embodiments, the sloping sidewalls 104, 105 may be adjustable allowing for changes in the angle of the sidewall so as to influence the downward flow of powder within the hopper. In another embodiment, the dimensions and orientations of all of the parts of the powder feeding apparatus 100 may be fixed with respect to each other.

Figure 5:
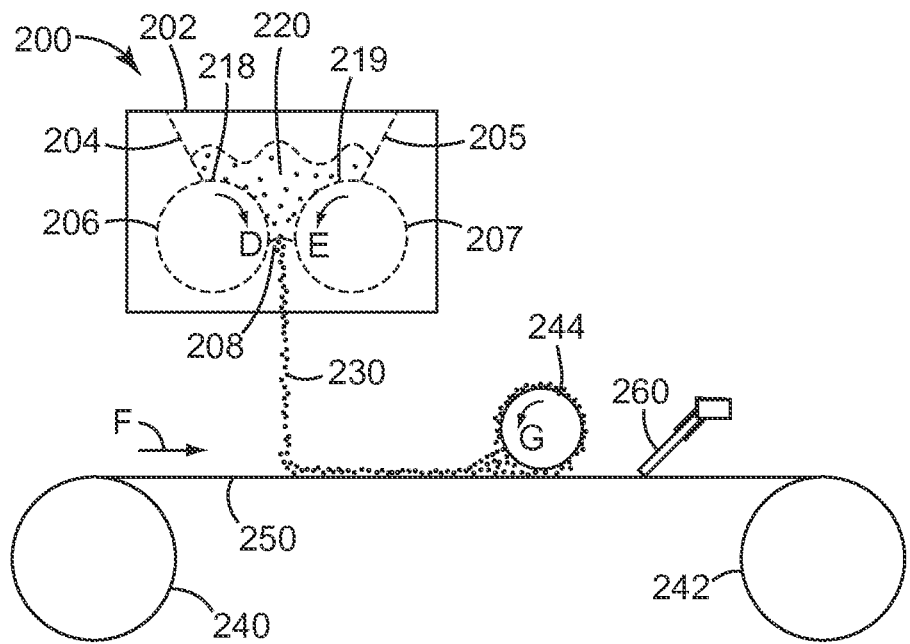
FIG. 5 is a schematic view of a powder feeding system.

One embodiment of a powder feeding system 200 employing a powder feeding apparatus as described above that can be useful for preparing dry powder inhalers is shown in FIG. 5. Powder can be provided 220 to partially fill a hopper 202 having sloping sidewalls 204, 205, cylindrical first and second rollers 206, 207, and a slot shaped opening 208. The first and second rollers 206, 207 have first and second hopper facing surfaces 218, 219, respectively, that can be in at least partial contact with powder held in the hopper. The rollers can be coupled to drive shafts, motors, and a control system (not shown) as generally described above. In use, the rollers can be driven independently and alternately of each other. That is, the first roller 206 can be initially rotated a fixed distance in the direction of arrow D and then stopped. Then the second roller 207 can be rotated a fixed distance in the direction of arrow E and then stopped. As the rollers are advancing, a portion of the provided powder 220 in the hopper flows through the opening 208 in a fine stream of dispensed powder 230. This cycle of first roller rotating, then stopping followed by second roller rotating, then stopping may be considered as a unit powder feeding operation. In use, this powder feeding operation can be then repeated indefinitely until a desired amount of powder has been dispensed. The dispensed powder 230 is allowed to fall under the force of gravity onto a moving web 250. The length of the rollers can be generally configured so as to cover a desired width of the moving web without extending beyond the edges of the web. The amount of powder dispensed onto a given area of web can be controlled by controlling the rate at which the powder is dispensed from the powder feeding apparatus 200, as well as by controlling the rate at which the web 250 is moving. The web 250 can be advanced by unwind and takeup rolls 240, 242, respectively, which advance the web in the direction of arrow F.

The web 250 comprises a plurality of microdepressions in the major surface of the web facing the powder feeding apparatus. Movement of the web in the direction of the arrow F causes the powder on the web to travel with the web to a powder filling stage that includes a driven roller 244 which can be held against the web and rotated in the direction of arrow G. The driven roller 244 serves to fill a portion of the powder into the one or more of the microdepressions on the web 250. Excess powder remaining on the surface of the web 250 after the web has passed the driven roller 244 may be removed with a doctor blade 260 before the web is wound up onto the takeup roll 242. Further details of such a powder coating process may be found in U.S. Patent Application Publication No. 2010/0229859 (Hodson et al.), the disclosure of which is hereby incorporated by reference in its entirety. Coated webs formed by such a process may be used as elongate carriers in dry powder inhalers, such as those described in International Publication WO 2010/135340 (Hodson et al.) and U.S. Pat. No. 5,469,843 (Hodson), the disclosures of which are hereby incorporated by reference in their entirety.

In another embodiment (not shown), a powder feeding system may employ a first powder feeding apparatus as described above and a second powder feeding apparatus, also as described above. The second powder feeding apparatus can be positioned so that it dispenses powder into the hopper of the first powder feeding apparatus. That is, the dispensed powder from the second powder feeding apparatus becomes the provided powder for the first powder feeding apparatus. The first powder feeding apparatus then dispenses this powder as described above. This arrangement can improve the uniformity of flow from the first powder feeding apparatus, since the powder dispensed from the second powder feeding apparatus acts as if it has been sieved in which any large agglomerates are significantly reduced or eliminated, such as by being broken into small agglomerates. That is, the provided powder to the first powder feeding apparatus has a high degree of uniformity in terms of its agglomeration state.

In another embodiment, a powder feeding apparatus as generally described above with respect to FIGS. 1-5 may be operated such that the first roller advances in an intermittent fashion as described above, but the second roller may advance in a continuous or semi-continuous fashion.

In another embodiment, a powder feeding apparatus as generally described above with respect to FIGS. 1-5 may be operated such that there may be instances in the powder feeding operation (or feeding cycle) where both rollers are in motion. That is, rather than the first roller having to be stopped before the second begins motion, the second roller may be started in motion shortly before the first roller stops. In one particular instance, the second roller will begin to accelerate into motion as the first roller is decelerating to a stop.

The rollers may be made of a variety of different materials. A general design feature for the rollers is that they can be generally hard and/or non-deformable and inert with respect to the powder being dispensed. In a preferred embodiment the rollers have a generally smooth surface on the outer cylindrical surface.

By non-deformable it should be understood that this applies both on a large scale and on a small scale. On a large scale the entire roller itself does not flex or bow out due to any force generated between the rollers as powder is forced through the slot shaped opening between the rollers. That is, if the width of the slot shaped opening is initially set to a fixed value, then it will remain constant regardless of the amount or type of powder being dispensed by the apparatus.

On a small scale the surface of the roller can be hard enough to inhibit individual particles or agglomerates of powder from being pressed or indented into the surface as might happen, for instance, if the surface was made of a soft elastomer. The specific hardness and non-deformability desired will depend to some extent upon the type and amount of powder being dispensed from the apparatus. In one instance the surface hardness of the rollers will be greater than about a hardness of 30 on the Rockwell A scale, greater than about a hardness of 50 on the Rockwell B scale, greater than a hardness of about 100 on the Vickers scale, greater than about 90 on the Brinell scale, or greater than about 100 on the Knoop scale, according to the various hardness scales as defined in ASTM E 140-07, "Standard Hardness Conversion Tables for Metals Relationship Among Brinell Hardness, Vickers Hardness, Rockwell Hardness, Superficial Hardness, Knoop Hardness, and Scleroscope Hardness". Other features that may be considered when selecting an appropriate roller material will also include cost and durability, selection of which will be readily evident to one of ordinary skill in the art. Examples of typical materials that may be used for the rollers include metals, such as steel, stainless steel, and aluminum, ceramics, and/or rigid plastics, such as polycarbonate, polyetheretherketone, acrylonitrile butadiene styrene.

In embodiments, the rollers will be generally smooth on the outer cylindrical surface. It should be understood that all virtually all surfaces may be characterized as having a certain amount of surface roughness. By smooth it is meant that any projections or depressions on the surface of the roller can be generally small in comparison to the average agglomerate size of the powder being dispensed. As will be readily understood, this will minimize any tendency for the powder agglomerates to get pressed into and retained on the surface of the roller. In embodiments, the surface roughness average (Ra) will be less than about 50 microinches (1.27 micron), in some embodiments less than about 20 microinches (0.51 micron), and in some embodiments less than about 10 microinches (0.25 micron). In addition to the smooth surface finish, it will be desirable for the surface of the rollers to be generally inert with respect to the powder being dispensed. Although relative inertness of the rollers may vary according to the particular powder being dispensed it will be readily apparent to one of skill in the art how to select an inert material for a given powder. Metals, such as steel, stainless steel, and aluminum, ceramics, and/or rigid plastics, such as polycarbonate, polyetheretherketone, acrylonitrile butadiene styrene will typically be relatively inert towards a wide range of powders.

In another embodiment, one or both rollers will have a functionally smooth surface. That is, a roller may have an appreciable surface roughness or intentional surface pattern, but that roughness or pattern can be loaded or filled in a relatively irreversible way by a fine cohesive powder. The roller will then effectively function as if it were a smooth roller once the roughness or pattern has been loaded or filled by a small amount of powder. Such a roller loaded with powder will have a functionally smooth surface.

The hopper sidewalls may be made of any suitable material that will contain powder within the hopper. In embodiments the hopper sidewalls can be made of the same material as the rollers and thus take advantage of the same desirable features with the respect to the powder. It should be noted, however, that the shear force between powder and hopper sidewalls can be less than the shear force between powder and rollers. Thus it may be desirable, for instance, for the hopper sidewalls to be made of a less durable material than the rollers in order to minimize cost or for the hopper sidewalls to be made from a transparent material to allow easy observation of the level of powder in the hopper. Likewise, the surface finish of the hopper sidewalls may be the same as that of the rollers, which, for example, may minimize hold-up of powder in the hopper, but rougher surfaces may also be employed without changing the essential function of the apparatus.

In some embodiments it may be desired to include one or more roller cleaning members that can remove excess powder on the surface of one or both rollers after the roller surface has rotated past the slot shaped opening and before the roller surface returns into contact with the powder in the hopper. As shown in FIGS. 1-4 the roller cleaning members are doctor blades, that is, a stiff member held against the cylindrical roller so that loose powder on the surface of roller can be scraped free by the doctor blade, but the roller can be free to rotate. In another embodiment, the roller cleaning members may include one or more brushes or pads held against the roller surface. In another embodiment, the roller cleaning member may be an air jet or a vacuum suction device that can dislodge powder from the surface of the roll.

The size of the slot shaped opening and diameter of the rollers will generally depend on the type and amount of powder to be dispensed, as well as on the desired area for the powder to be dispensed onto. In some embodiments, the slot shaped opening will have a width, or gap, of at least about 0.2 mm, in some embodiments, at least about 0.3 mm, and in some embodiments, at least about 0.5 mm. In some embodiments, the slot shaped opening will have a width, or gap, of less than about 2 mm, in some embodiments, less than about 1.5 mm, and in some embodiments, less than about 1 mm. In some embodiments, the slot shaped opening will have a length of at least about 0.5 cm, in some embodiments, at least about 1 cm, and in some embodiments, at least about 2 cm. In some embodiments, the slot shaped opening will have a length of less than about 100 cm, in some embodiments, less than about 50 cm, and in some embodiments, less than about 20 cm. In some embodiments, the roller diameter will be at least about 0.5 cm, in some embodiments, at least about 1 cm, and in some embodiments, at least about 2 cm. In some embodiments, the roller diameter will be less than about 10 cm, in some embodiments, less than about 5 cm, and in some embodiments, less than about 3 cm.

The first roller can be advanced by being rotated intermittently. By intermittently it is meant that the roller will alternate between a rotational phase and a stationary phase. As described above, the first roller can be advanced in a direction such that the surface of the roller that forms part of the lower inside surface of the hopper moves towards the slot shaped opening. The specific intermittent motion may be generally characterized by the rotational distance that the roll travels (e.g., 360° being a full rotation) during a single rotational phase, the speed with which the roller rotates (or alternatively the length of time it takes to complete a single rotational phase), and the length of time that the roller remains in a single stationary phase. In embodiments the alternation between rotational and stationary phases can be fixed and regular. That is, each rotational phase has the same length of travel and speed and each stationary phase has the same length of time. In embodiments the rotational distance that the roller travels during a single rotational phase can be less than about 360°, in some embodiments less than about 90°, in some embodiments less than about 30°, and in some embodiments less than about 10°. In embodiments the rotational distance that the roller travels during a single rotational phase can be more than about 0.5°, in some embodiments more than about 1°, and in some embodiments more than about 3°. In embodiments the average speed with which the roller rotates during a single rotational phase can be less than about 10°/msec, in some embodiments less than about 5°/msec, and in some embodiments less than about 1°/msec. In embodiments the average speed with which the roller rotates during a single rotational phase can be more than about 0.01°/msec, in some embodiments more than about 0.05°/msec, and in some embodiments more than about 0.1°/msec. In embodiments the average speed with which the roller rotates during a single rotational phase can be less than about 200 cm/sec, in some embodiments less than about 100 cm/sec, and in some embodiments less than about 20 cm/sec. In embodiments the speed with which the roller rotates during a single rotational phase can be more than about 0.2 cm/sec, in some embodiments more than about 1 cm/sec, and in some embodiments more than about 2 cm/sec.

In embodiments the second roller can be advanced by being rotated intermittently. In embodiments the rotational distances, speeds, and length of time remaining in the stationary phase fall in the same ranges as those described above for the motion of the first roller. In embodiments the rotational distances, speeds, and length of time remaining in the stationary phase will be the same for the first and second roller.

In embodiments the first and second roller will advance and stop so that their motion is completely out of phase. That is, the first roller will be rotating during the entire time that the second roller will be stationary and the second roller will be rotating during the entire time that the first roller will be stationary.

In another embodiment the second roller will be stationary while the first roller is rotating and the first roller will be stationary while the second roller is rotating, but there will also be an additional period of time during which neither roller is rotating. No powder will be dispensed during this "hold" or "idle" phase when both rollers are stationary. In particular, this may be a convenient way to adjust the overall powder dispensing rate without having to make changes to other system parameters, such as the size of the slot shaped opening or the speed with which the rollers rotate. The hold time may vary as appropriate to achieve a desired overall feed rate for given distances and speed of rotation of the rollers. In embodiments the hold time can be more than about 1 msec, in some embodiments more than about 10 msec, and in some embodiments more than about 25 msec. In embodiments the hold time can be less than about 1000 msec, in some embodiments less than about 500 msec, and in some embodiments less than about 100 msec.

Although it can be preferred that only one roller be rotating at any given time, there may be an overlap time during which both rollers are rotating. For instance, in embodiments, the second roller may be accelerated from its stationary position at the same time the first roller is being decelerated to its stationary position. Thus both rollers are advancing, albeit one accelerating and one decelerating.

The two rollers rotate independently of each other. That is, they do not always advance together or remain stationary together in lockstep with each other. Even though there may be moments when they are both moving or both stationary, they move independently of each other because there are other moments when one is moving and the other is stationary. Likewise, even though the drive and control systems may be configured so that they move entirely and exactly out of phase with other, they move independently of each other The drive system can be any mechanism and power source suitable for advancing or rotating the first and second rollers. Most typically the drive system will be one or more motors connected via appropriate gearing to shafts that run down the central axis of the cylindrical rollers. In embodiments, the drive system will have a first motor coupled to the first roller via a first set of gearing and a second motor coupled to the second roller via a second set of gearing. As such, the first and second motors can be operated independently of each other so as to drive the rollers independently of each other. The control system can be any suitable system that directs the motion of the drive system. Most typically the control system can be an electrical or computer controller that sends signals to the drive system (e.g., motors) so as to effect the desired rate of motion of each roller. The control and drive systems may be adjustable with respect to parameters that influence the powder feeding process. That is, the control system may allow for user inputs to independently adjust any one or all of the first and/or second roller speed, the distance that the first and/or second roller rotates, and the time that the first and/or second roller remains stationary in between rotational steps. In some embodiments certain of these parameters may be fixed, but it should be noted that they are still independently selected for the first and second rollers. For example, a portion of the drive system may work in concert with the control system to generate intermittent and alternate rotation of the rollers. For example, a single motor can be used to drive both rollers using gearing that will allow for the first and second rollers to move at different intervals or rates. One example of such gearing would be a gear wheel having missing teeth, so that it alternately interacts with the first roller shaft and the second roller shaft. In such a case, adjustment of the motor speed would affect the rate of rotation of both the first and second rollers to the same degree, but the first roller would still rotate independently of the second roller by virtue of the overall design. In embodiments, the control system can be non-adjustable by an operator and contains fixed values suitable for a specific powder feeding operation.

In embodiments, a method of feeding powder using powder feeding apparatus is as generally described above. The method comprises a first step of providing powder to the powder feeding apparatus. A series of powder feeding operations are performed, where each powder feeding operation includes the steps of rotating the first roller a fixed rotational distance and then stopping it. After stopping the first roller, the second roller can be then rotated a fixed rotational distance and then stopped. This cycle of first roller motion followed by second roller motion can be then continued indefinitely until the desired amount of powder has been dispensed.

The provided powder will generally be a non-free flowing powder. By non-free flowing it is meant that the powder can be filled into a stationary powder feeding apparatus as described above and the powder will arch or bridge across the slot shaped opening. That is, in the absence of motion of the rollers or other urging of the powder, the powder will not flow through the slot shaped opening. In contrast, a free flowing powder will pour through the slot-shaped opening merely due to the force of gravity on the powder.

In embodiments, the provided powder can be cohesive. That is, individual particles of the powder have the tendency to adhere to each other in a manner that tends to inhibit the flowability of the powder. It is generally the case that powders made up of fine particles, that is, a micronized powder, will often be cohesive. Other influences that may cause a powder to be cohesive include particle shape, with irregular, non-spherical shapes often leading to increased cohesion, as well as free moisture content, which can cause capillary forces between individual particles. There are a variety of quantitative measures of powder cohesion as discussed below.

In embodiments the provided powder has an angle of repose greater than about 40 degrees, in some embodiments greater than about 50 degrees, and in some embodiments greater than about 60 degrees. Angle of repose may be determined according to ASTM D6393-08, "Standard Test Method for Bulk Solids Characterization by Can Indices".

In embodiments the provided powder has a Jenike flow index of less than about 4, in some embodiments less than about 3, and in some embodiments less than about 2. The Jenike flow index may be determined according to ASTM D6128-06, "Standard Test Method for Shear Testing of Bulk Solids Using the Jenike Shear Cell".

In embodiments the provided powder has a Carr Compressibility Index of greater than about 15, in some embodiments greater than about 20, and in some embodiments greater than about 25. The Can Compressibility Index may be determined according to ASTM D6393-08, "Standard Test Method for Bulk Solids Characterization by Can Indices".

In embodiments the free water content of the powder can be greater than 2% by weight, in some embodiments greater than 5%, and in some embodiments greater than 10%. Free water is generally considered to be water that is adsorbed to a powder and that can be removed under drying conditions that will remove water, but that will not otherwise change the powder (e.g, cause chemical degradation, melting or other change of crystal morphology). This is in contrast, for instance, to the bound water present in molecular hydrates, such as $\alpha$-lactose monohydrate, or water entrapped within crystalline powders. Free water content can generally be determined by loss of weight upon drying at appropriate conditions for a particular powder.

In embodiments the provided powder has an average, unagglomerated or primary particle size of less than about 50 microns, in some embodiments less than about 20 microns, and in some embodiments less than about 10 microns.

In embodiments the provided powder will at least partially comprise of relatively large agglomerates with an average dimension greater than or equal to about 2 mm. In many instances, agglomerates may be irregular in size and thus be characterized by differing dimensions depending on measurement orientation. The size of an irregular agglomerate may be equated to a spherical particle having the same volume as the agglomerate and the average dimension of such an irregular agglomerate reported as the diameter of the equivalent spherical particle. Without wishing to be bound by theory, it is believed that the process of dispensing the provided powder through the slot shaped gap imparts a shear force to the powder that tends to break up any agglomerates in the provided powder, such that the dispensed powder is more finely dispersed. In embodiments, the dispensed powder will at least partially comprise of fine agglomerates with an average dimension less than 2000 microns, in some embodiments less than 200 microns, and in some embodiments less than 50 microns. In embodiments, the dispensed powder will be essentially free of large agglomerates having an average dimension greater than or equal to about 0.5 mm. In embodiments the provided powder may be pre-sieved. That is, the powder will have been through a sieving process that may serve to break down large agglomerates. In such an instance, the provided powder may already comprise fine agglomerates, but the shear forces imparted to the provided powder may still break down these agglomerates into smaller agglomerates in the dispensed powder.

The provided powder may be a wide variety of different materials, including without limitation, foodstuffs, medicaments, cosmetics, abrasive granules, and absorbents.

In embodiments the provided powder can be a medicament or drug. Accurate and precise dispensing of powder may be desired in preparing all types of pharmaceutical dosage forms, including oral dosages, such as tablets and capsules, transdermal dosages, such as transdermal patches, topical dosages, such as creams and gels, and inhalation dosages, such as dry powder inhalers, metered dose inhalers, and nebulizers. The dispensed powders may be especially desirable for use in dry powder inhalers, as the drug in a dry powder inhaler remains in particulate form until inhaled by a patient and it is generally desirable that the inhaled particulates be very fine in size.

Suitable medicaments include any drug or combination of drugs that is a solid or that may be incorporated in a solid carrier. Suitable drugs include those for the treatment of respiratory disorders, e.g., bronchodilators, anti-inflammatories (e.g., corticosteroids) anti-allergics, anti-asthmatics, anti-histamines, and anti-cholinergic agents. Other drugs such as anorectics, anti-depressants, anti-hypertensive agents, anti-neoplastic agents, anti-tussives, anti-anginals, anti-infectives (e.g., antibacterials, antibiotics, anti-virals), anti-migraine drugs, anti-peptics, dopaminergic agents, analgesics, beta-adrenergic blocking agents, cardiovascular drugs, hypoglaecemics, immunomodulators, lung surfactants, prostaglandins, sympathomimetics, tranquilizers, steroids, vitamins and sex hormones, vaccines and other therapeutic proteins and peptides may also be employed.

A group of preferred drugs for use in inhalation dosages include adrenaline, albuterol, atropine, beclomethasone dipropionate, budesonide, butixocort propionate, ciclesonide, clemastine, cromolyn, epinephrine, ephedrine, fentanyl, flunisolide, fluticasone, formoterol, ipratropium bromide, isoproterenol, lidocaine, mometasone, morphine, nedocromil, pentamidine isoethionate, pirbuterol, prednisolone, resiquimod, salmeterol, terbutaline, tetracycline, tiotropium, triamcinolone, vilanterol, zanamivir, 4-amino-α,α,2-trimethyl-1H-imidazo[4,5-c]quinoline-1-ethanol 2,5-diethyl-10-oxo-1,2,4-triazolo[1,5-c]pyrimido[5,4-b][1,4] thiazine, 1-(1-ethylpropyl)-1-hydroxy-3-phenylurea, and pharmaceutically acceptable salts and solvates thereof, and mixtures thereof.

EXAMPLES

Example 1

A powder feeding apparatus of the design described in FIGS. 1-5 was used. The two cylindrical rollers were positioned side-by-side (in the same horizontal plane) and in a parallel orientation to each other. Each roller was prepared from polished stainless steel with dimensions of about 4.4 cm in length and 2.5 cm in diameter. The roughness average (Ra) of the rollers was about 0.25 microns (10 microinches). The slot shaped opening between the two rollers was set at 0.8 mm. The rollers were independently driven by SM2316D-PLS2 SmartMotors® (Animatics Corporation, Santa Clara, Calif.) programmed to rotate in an alternating sequence (one roller rotating, while the other roller was held stationary). Each roller made a 4.1 degree step rotation in the direction of the opposing roller. Each step rotation required a total of about 24.5 milliseconds. There was no idle time between the individual roller rotations. A stainless steel doctor blade was positioned against each roller.

The hopper portion of the powder feeding apparatus was prepared from aluminum with internal dimensions of about 5.1 cm (length), about 4.4 cm (width), and about 2.4 cm (height measured from the top surface of the rollers). The hopper sidewalls that were oriented in the lengthwise direction of the cylindrical rollers were each sloped at a 62 degree angle toward the slot shaped opening.

Micronized lactose having an average particle size of 2.65 microns (Micron Technologies, Malvern, Pa.) was added to fill the hopper and the lactose was fed through the apparatus by gravity and rotation of the rollers. The powder feeding process was conducted at 21° C. and 40% relative humidity. Additional lactose was added to the hopper during the course of the powder feeding measurements in order to keep the hopper filled.

Figure 6:
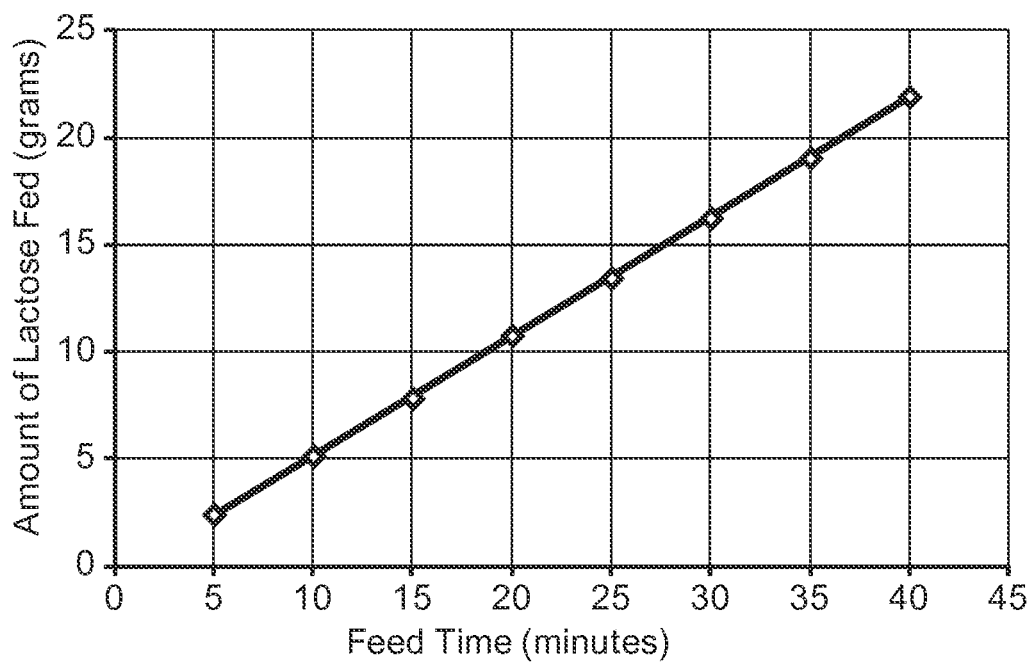
FIG. 6 is a graph depicting the mass of dispensed lactose as a function of time for Example 1.

To achieve a steady state of operation, the apparatus was operated for five minutes before measurements were taken. The amount (in grams) of lactose fed from the apparatus was automatically measured and recorded at defined points over a forty minute period. The results are presented in Table 1. The results from Table 1 were plotted (shown in FIG. 6) and the feed rate was determined to be 0.56 grams of lactose per minute ($R^2$=0.9999).

TABLE 1

| Feed Time (minutes) | Total Amount of Lactose Fed (grams) |
| --- | --- |
| 5 | 2.42 |
| 10 | 5.15 |
| 15 | 7.85 |
| 20 | 10.77 |
| 25 | 13.45 |
| 30 | 16.25 |
| 35 | 19.05 |
| 40 | 21.94 |

Example 2

Figure 7:
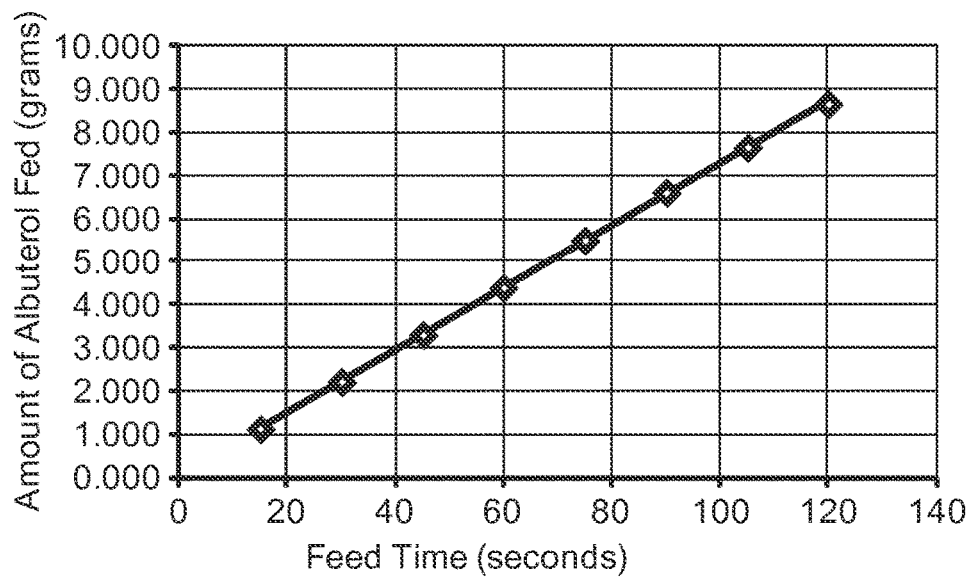
FIG. 7 is a graph depicting the mass of dispensed albuterol sulfate as a function of time for Example 2.

The powder feeding apparatus described in Example 1 was used. Albuterol sulfate having an average particle size of 1.5 microns 3M, Northridge, Calif. (3M micronized material received from Plantex (Teva), instead of lactose, was added to fill the hopper and the albuterol sulfate was fed through the apparatus by gravity and rotation of the rollers. The powder feeding process was conducted at 21° C. and 40% relative humidity. Additional albuterol sulfate was added to the hopper during the course of the powder feeding measurements in order to keep the hopper filled.

The following parameters were changed from Example 1. Each roller made a 2.9 degree step rotation in the direction of the opposing roller (instead of a 4.1 degree step rotation) with each step rotation requiring a total of about 24.5 milliseconds. The slot shaped opening between the two rollers was set at 0.9 mm (instead of 0.8 mm).

There was no idle time between the individual roller rotations. The apparatus was operated for a few seconds before measurements were taken. The amount (in grams) of albuterol sulfate fed from the apparatus was automatically measured and recorded at defined points over a two minute period. The results are presented in Table 2. The results were plotted (shown in FIG. 7) and the feed rate was determined to be 72 mg of albuterol sulfate per second ($R^2$=0.9999).

TABLE 2

| Feed Time (seconds) | Total Amount of Albuterol Sulfate Fed (grams) |
|---|---|
| 15 | 1.130 |
| 30 | 2.220 |
| 45 | 3.307 |
| 60 | 4.394 |
| 75 | 5.503 |
| 90 | 6.610 |
| 105 | 7.661 |
| 120 | 8.667 |

Example 3

The same experimental procedure as described in Example 2 was followed with the exception that the idle time between the individual roller rotations was set at 24.5 milliseconds (instead of no idle time).

Figure 8:
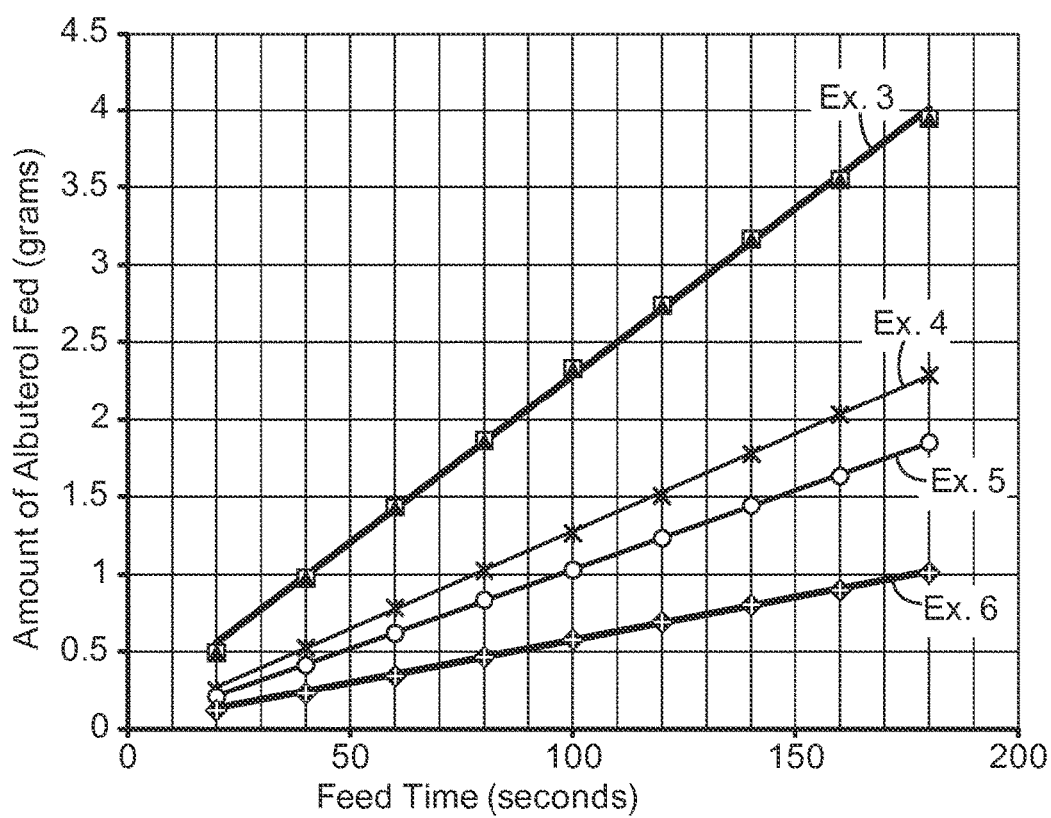
FIG. 8 is a graph depicting the mass of dispensed albuterol sulfate as a function of time for Examples 3-6.

The apparatus was operated for a few seconds before measurements were taken. The amount (in grams) of albuterol sulfate fed from the apparatus was automatically measured and recorded at defined points over a three minute period. The results are presented in Table 3. The results were plotted (shown in FIG. 8) and the feed rate was determined to be 21.5 mg of albuterol sulfate per second ($R^2$=0.9989).

Example 4

The same experimental procedure as described in Example 2 was followed with the exception that the idle time between the individual roller rotations was set at 49 milliseconds (instead of no idle time).

The apparatus was operated for a few seconds before measurements were taken. The amount (in grams) of albuterol sulfate fed from the apparatus was automatically measured and recorded at defined points over a three minute period. The results are presented in Table 3. The results from Table 3 were plotted (shown in FIG. 8) and the feed rate was determined to be 12.6 mg of albuterol sulfate per second ($R^2$=0.9998).

Example 5

The same experimental procedure as described in Example 2 was followed with the exception that the idle time between the individual roller rotations was set at 73.5 milliseconds (instead of no idle time).

The apparatus was operated for a few seconds before measurements were taken. The amount (in grams) of albuterol sulfate fed from the apparatus was automatically measured and recorded at defined points over a three minute period. The results are presented in Table 3. The results from Table 3 were plotted (shown in FIG. 8) and the feed rate was determined to be 10.2 mg of albuterol sulfate per second ($R^2$=0.9999).

Example 6

The same experimental procedure as described in Example 2 was followed with the exception that the idle time between the individual roller rotations was set at 184 milliseconds (instead of no idle time).

The apparatus was operated for a few seconds before measurements were taken. The amount (in grams) of albuterol sulfate fed from the apparatus was automatically measured and recorded at defined points over a three minute period. The results are presented in Table 3. The results from Table 3 were plotted (shown in FIG. 8) and the feed rate was determined to be 5.6 mg of albuterol sulfate per second ($R^2$=0.9994).

TABLE 3

| Example Number | Roller Idle Time (msec) | Total Amount of Albuterol Sulfate Fed (grams) | | | | | | | | |
|---|---|---|---|---|---|---|---|---|---|---|
| | | 20 | 40 | 60 | 80 | 100 | 120 | 140 | 160 | 180 |
| Ex 3 | 24.5 | 0.504 | 0.984 | 1.442 | 1.871 | 2.338 | 2.747 | 3.174 | 3.556 | 3.951 |
| Ex 4 | 49 | 0.260 | 0.533 | 0.791 | 1.031 | 1.271 | 1.514 | 1.784 | 2.040 | 2.295 |
| Ex 5 | 73.5 | 0.216 | 0.422 | 0.627 | 0.842 | 1.035 | 1.241 | 1.452 | 1.641 | 1.858 |
| Ex 6 | 184 | 0.127 | 0.239 | 0.350 | 0.474 | 0.585 | 0.700 | 0.811 | 0.906 | 1.018 |

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

The invention claimed is:

1. A powder feeding apparatus comprising:
   a hopper having sidewalls and a bottom, wherein the bottom comprises first and second cylindrical rollers positioned adjacent to each other and configured so as to define a slot shaped opening between the two rollers in the hopper bottom,
   a drive system for rotating the first and second rollers, and
   a control system for controlling the drive system,
   wherein the drive system and control system are configured to repeatedly alternate the first roller between a rotational phase and a stationary phase independently of the second roller,
   wherein during the stationary phase the first roller does not rotate.

2. A powder feeding apparatus according to claim 1, wherein the drive system and control system are configured to intermittently rotate the second roller independently of the first roller.

3. A powder feeding apparatus according to claim 1, wherein the drive system comprises a first motor coupled to the first roller and a second motor coupled to the second roller.

4. A powder feeding apparatus according to claim 1, wherein the control system comprises a first controller for the first motor and a second controller for the second motor.

5. A powder feeding apparatus according to claim 1, wherein the control system is configured to rotate the first roller while the second roller is stationary.

6. A powder feeding apparatus according to claim 1, wherein the control system is configured to rotate the second roller while the first roller is stationary.

7. A powder feeding system comprising: a powder feeding apparatus as claimed in claim 1; a movable web positioned beneath the slot shaped opening in the hopper bottom; and a coating roller adjacent the web and spaced apart from the position on the web beneath the slot shaped opening.

8. A powder feeding system comprising: a first powder feeding apparatus as claimed in claim 1; a second powder feeding apparatus as claimed in claim 1; wherein the second powder feeding apparatus is positioned so that dispensed powder from the second powder feeding apparatus is dispensed into the hopper of the first powder feeding apparatus.

9. A powder feeding apparatus according to claim 1, wherein the drive system and control system are further configured to maintain the second roller stationary when the first roller is rotating.

10. A powder feeding apparatus according to claim 1, wherein the drive system and control system are further configured to maintain the first roller stationary when the second roller is rotating.

11. A powder feeding apparatus according to claim 1, and further comprising roller cleaning members adjacent the first and second rollers and positioned away from the slot shaped opening.

12. A powder feeding apparatus according to claim 11, wherein the roller cleaning members are doctor blades.

13. A powder feeding apparatus according to claim 1, wherein the lower portion of at least one of the hopper sidewalls are sloped towards the slot shaped opening.

14. A powder feeding apparatus according to claim 1, wherein the slot shaped opening has a width of between about 0.3 and 5 mm.

15. A powder feeding apparatus according to claim 1, wherein the slot shaped opening has a length of between about 0.5 and 100 cm.

16. A powder feeding apparatus according to claim 1, wherein the first and second rollers have a Rockwell A hardness of greater than about 30.

17. A powder feeding apparatus according to claim 1, wherein the first and second rollers have a smooth outer cylindrical surface.

18. A powder feeding apparatus according to claim 1, wherein the outer cylindrical surface of the first and second rollers has a roughness average of less than 50 microinches (1.27 micron).

19. A powder feeding apparatus according to claim 1, wherein the first and second rollers comprise stainless steel.

* * * * *